Figure 1:
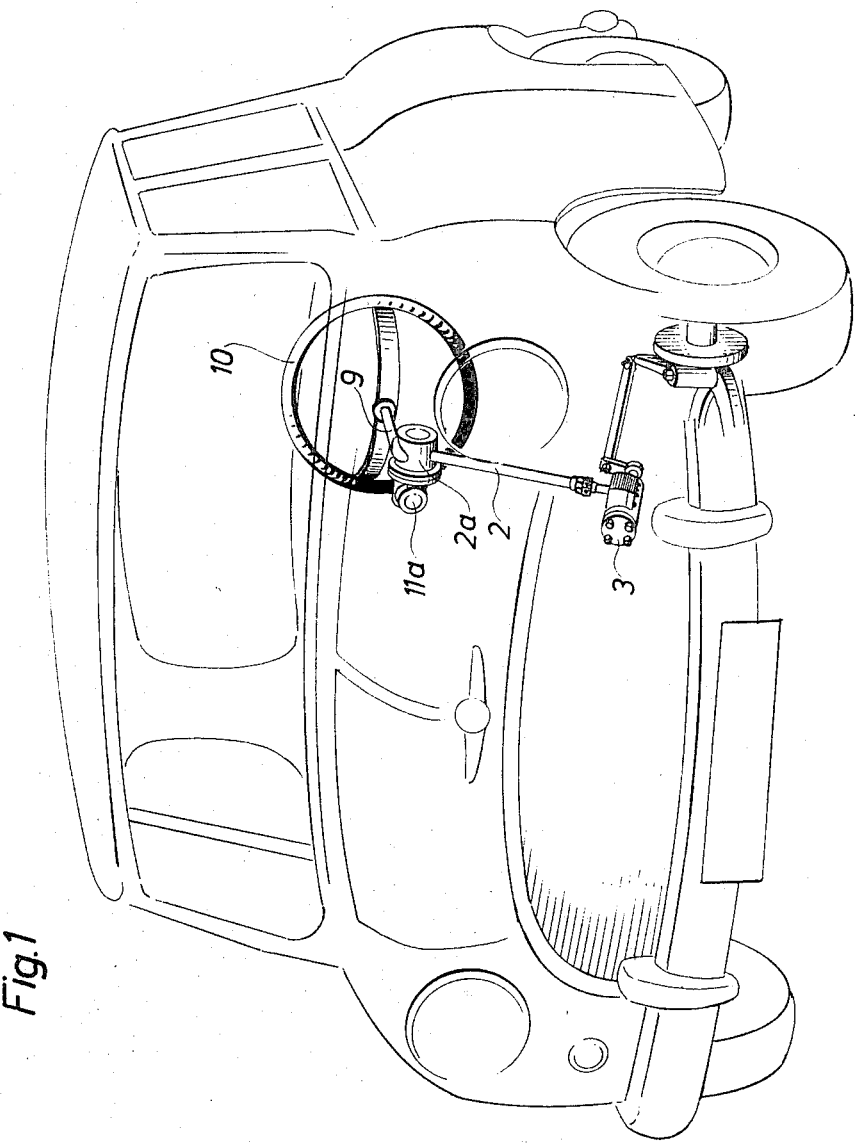

United States Patent [19]

Lindstrom

[11] 3,786,691

[45] Jan. 22, 1974

[54] VEHICLE STEERING GEAR

[76] Inventor: Bengt Lindstrom, Eriksbergsgatan 34, Stockholm, Sweden

[22] Filed: Aug. 18, 1972

[21] Appl. No.: 281,800

[30] Foreign Application Priority Data
Aug. 23, 1971  Sweden............................. 10689/71

[52] U.S. Cl....................... 74/493, 74/385, 74/417
[51] Int. Cl............................ B62d 1/18, F16h 1/14
[58] Field of Search.............. 74/385, 417, 493, 492

[56] References Cited
UNITED STATES PATENTS

| | | | |
|---|---|---|---|
| 1,548,411 | 8/1925 | Derr | 74/493 |
| 2,348,266 | 5/1944 | Selby | 74/417 |
| 756,670 | 4/1904 | Marr | 74/493 |
| 930,431 | 8/1909 | Stewart | 74/385 X |
| 2,140,319 | 12/1938 | Heppner et al. | 74/493 |
| 2,235,427 | 3/1941 | Harris | 74/417 X |
| 2,291,729 | 8/1942 | Koett | 74/417 X |
| 3,258,988 | 7/1966 | Schmidt | 74/493 |
| 3,628,396 | 12/1971 | Grobowski | 74/493 |

*Primary Examiner*—Allan D. Herrmann
*Attorney, Agent, or Firm*—Cushman, Darby & Cushman

[57]  ABSTRACT

A vehicle steering column is divided into an upper and a lower column section connected through a bevel gear unit. The two sections are off-set and may be adjusted to different angular positions. An impact axial force of a predetermined magnitude on any of the column sections will release the connection between the column sections in order to prevent that excessive impact forces are transmitted to the driver.

4 Claims, 5 Drawing Figures

VEHICLE STEERING GEAR

The present invention relates to a steering gear for wheel-driven vehicles, especially automobiles, comprising a steering column divided into two sections, namely at least one lower steering column section connected to a steering worm or the like, and at least one upper steering column section, to which the steering wheel is attached. The object of the invention is to provide a novel and useful arrangement whereby the different sections of the steering column are able to move relative to each other when the lower and/or the upper steering column section is subjected to a heavy impact force acting in an axial direction, e.g. with a frontal collision. When a vehicle is involved in a head-on collision, the steering column of conventional automobiles is often pushed up against the driver of the vehicle, causing the driver serious injury, or the driver is thrown against the steering wheel, thereby frequently sustaining damage to the body.

For the purpose of ensuring positive, normal steering movements of the vehicle wheels in response to steering wheel movement and to avoid injury to the driver when the steering column section attached to the steering wheel is subjected to hard collision impact, it has been proposed that the two steering column sections be connected together by a torque transmitting system of cylindrical gear wheels which permit axial relative movement between the lower and the upper steering column sections, e.g. when the lower steering column section is subjected to a heavy impact force acting in an axial direction.

It has been discovered, however, that these measures do not save the driver of a vehicle from injury against the driving column when the vehicle is involved in a frontal collision. However, in accordance with the present invention, the longitudinal axes of the aforementioned separate steering column sections are offset in relation to each other, and said sections are interconnected by means of bevel gear wheels so that the column sections may be adjusted to different axial directions relative one another Because of the bevel gear wheel transmission between the steering column sections, the lower section when subjected to an impact force acting upwardly in an axial direction will move in a direction which deviates from the axial direction of the section to which the steering wheel is attached and which prevents the lower steering column section from striking the driver. Thus, the lower steering column section moves axially in a direction away from the axial direction of the upper steering column section supporting the steering wheel, so as to miss the driver of the vehicle in the event of a head-on collision.

Figure 2:
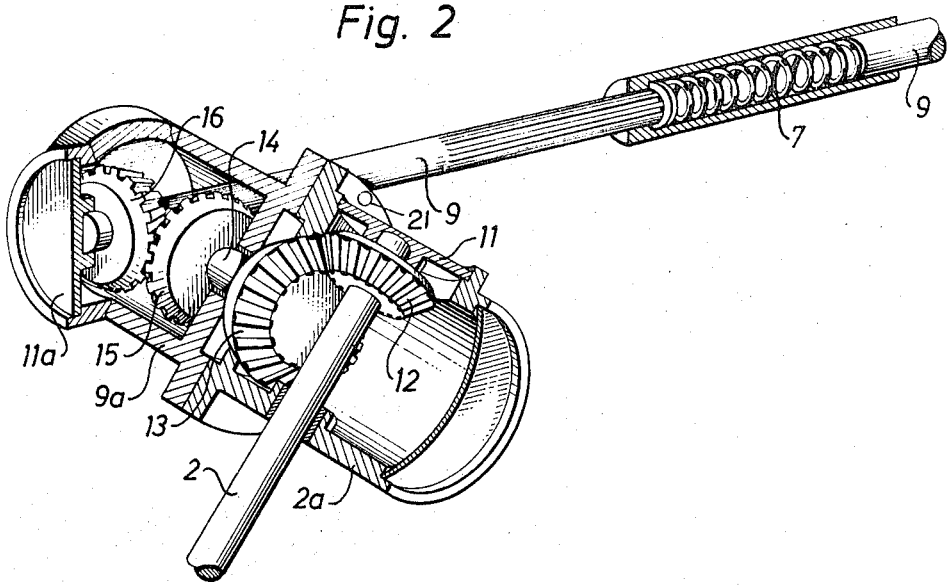
Figure 3:
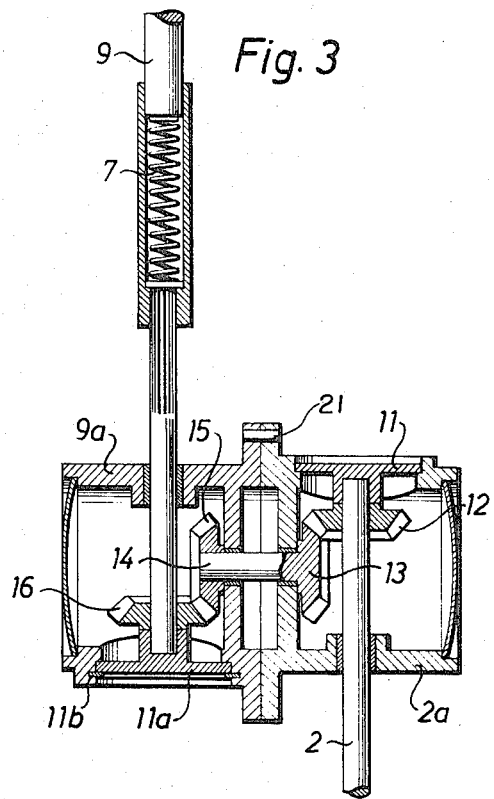
Figure 4:
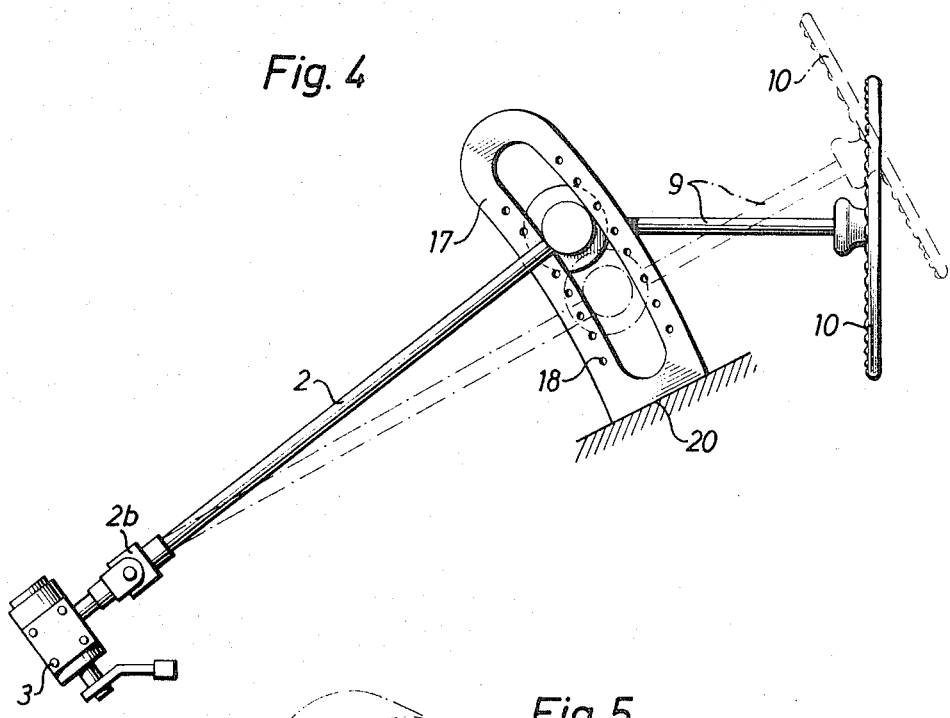
Figure 5:
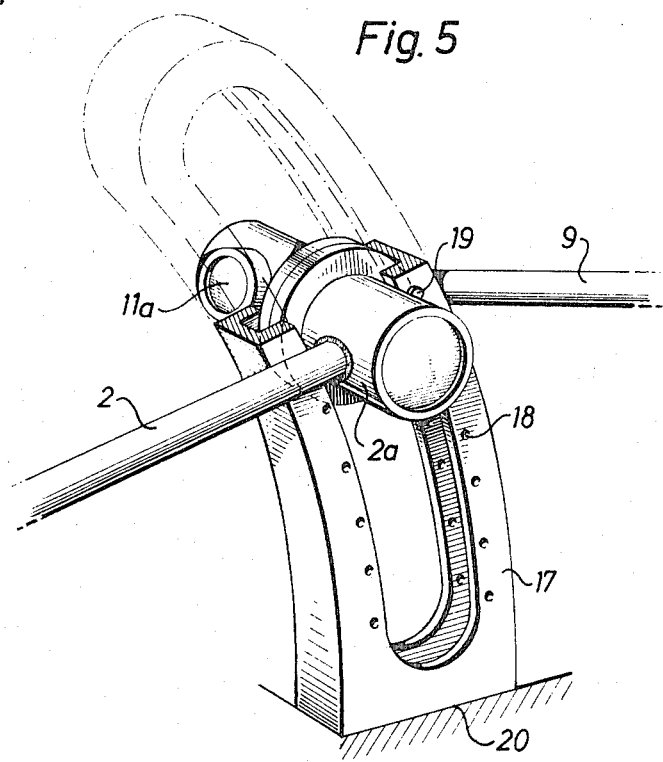

The invention will now be described in detail with reference to an embodiment thereof illustrated in the accompanying drawings, in which FIG. 1 illustrates in perspective and in phantom view an automobile provided with the steering gear according to the invention, FIG. 2 is a perspective view of the torque transmitting bevel gear wheel connection with certain portions removed to illustrate the inner parts of the gear unit, FIG. 3 is a sectional view of the gear unit illustrated in FIG. 2, FIG. 4 is a diagrammatic view of the two steering column sections in the two different angular positions of the lower steering column section, and FIG. 5 is a diagrammatic perspective broken detail view illustrating how the gear housing is displaceable and lockable in different positions along a circular arc guide.

Referring to FIG. 1, an automobile 1 is provided with a steering worm 3 or the like which cooperates with means for transmitting movement to the wheels of the vehicle. Extending from the steering worm 3 which is attached to the chassi of the vehicle, is a lower steering column section 2 which is connected at the end remote from the worm 3 to a bevel gear wheel 12 located in a housing 2a. The column section 2 is mounted in the wall of the housing 2a, optionally in a special support means arranged in the housing. The lower column section 2 is at its lower end portion connected through a universal joint 2b with the input end of the worm 3 so that the lower column section may be moved to different angular positions.

The housing 2a is completely closed but has a relatively easily detachable cover or lid 11 which is provided with a bearing for supporting the end of the adjacent column section.

As will be seen from FIGS. 2 and 3, the steering gear of the present invention also includes an upper steering column section 9 to which the steering wheel 10 of the vehicle is attached. The longitudinal axis of the steering column section 9 is off-set relative the longitudinal axis of the steering column section 2, and the two sections 2, 9 are drivingly connected by bevel gear wheels 12, 13, 15, 16, the arrangement being such that in the event of a head-on collision the lower steering column section 2 will press out the lid 11 and the wheel 12 through the lid opening in the housing. The column section 2 will then move away from the steering column section 9 supporting the steering wheel 10, thereby missing the driver of the vehicle. The bevel gear wheel 12 connected to the section 2 engages the bevel gear wheel 13 arranged on one end of a transversely extended shaft 14 which is rotatably journalled inside the housing 2a in the two end walls of the two housings 2a, 9a. At its other end the shaft 14 is provided with the bevel gear wheel 15 which meshes with the bevel gear wheel 16 on the upper steering column section 9. The bevel gear wheel 16 attached to the upper steering column section 9 is arranged in the housing 9a.

As understood from FIG. 4, the two steering columns 2 and 9 may be adjusted to different angular positions relative one another. To enable this the two housings 2a and 9a are rotatable relative one another and centered by means of the shaft 14 journalled in the end walls of the housings 2a, 9a facing each other, as shown in FIG. 2. The end walls extend outside the periphery of the housings 2a, 9a and form together a circular flange which is displaceable along the circular arc guide 17 shown in FIG. 5 and having its centre in the universal joint 2b or other pivot point at the lower end of the lower steering column 2. The guide 17 comprises two rails having U-sections as shown in FIG. 5. The circular flanges formed by the end walls of the housings 2a, 9a have borings 21 (FIGS. 2 and 3) for receiving locking bolts 19 which have been inserted through borings 18 in the stationary guide walls of the guide 17 and into the bores in said circular flanges to lock the housings in any desired angular position relative to one another and to lock the gear housings 2a, 9a in the desired position along the guide 17 which is secured to the chassi or frame 20 of the automobile. Although not shown, it should be understood that the upper steering column 9 is journalled in a bearing which is adjustably positioned along a vertical guide. If the steering column section 2 is subjected to a heavy impact, the section 2 together with the bevel gear wheel 12 will be moved in the axial direction of the section 2 and press out the cover or lid 11. The direction to which the steering column section 2 is adjusted or mounted should be selected so that this section does not strike sensitive vehicle components or the driver when moved upwardly as a result of a collision.

Similarly to the lower steering column section 2, the upper column section 9 is also liable to pressure impact in the event of a collision, e.g. as a result of the driver of the vehicle being thrown against the wheel. Consequently, it is also suitable to provide means which enables the upper steering column section to yield when subjected to heavy impact forces. To this end there is provided in the illustrated embodiment a spring 7 adapted to absorb axial forces. The spring 7 is located in a sleeve having axial teeth engaging corresponding axial teeth on the lower part of the upper steering column section 9, whereas the upper end of the sleeve is secured to the upper part of the column 9 as illustrated in FIGS. 2 and 3. It is also possible to provide in a similar manner a pushing and/or pulling spring in the lower steering column section 2. If the impact is so great that the spring means 7 is unable to effectively absorb the same, the column section 9 and its associated bevel gear wheel 16 will push out the cover or lid 11a located opposite the gear 16 in a corresponding opening in the wall of the housing 9a. The gear wheel 16 journalled in a bearing supported by the cover 11a is prevented from being disengaged from the gear wheel 15 when the section 9 is subjected to light, downwardly acting forces, by means of an O-ring 11b which latches the cover 11 against such relatively small forces.

The embodiment illustrated in FIGS. 1–5 also affords the added advantages that the axial direction of the upper steering column section 9 bearing the driving wheel 10 may be adjusted to different positions so as to provide a certain degree of selectivity in choosing a suitable driving position for the driver.

As will be understood from the above explanations with reference to FIGS. 1 to 5, the lower steering column section 2 may have a fixed angular position or may be adjustable to various angular positions. When the lower column section 2 may be adjusted, the housings 9a, 2a are guided along a stationary circular arc path such as 17 and are lockable thereto in the desired position. Furthermore, the two housings 2a, 9a may have a fixed angular position relative one another or may be rotatable relative one another to various relative positions depending on the desired angle between the two column sections 2 and 9. Finally, the upper steering column section 9 may have a fixed position or may be adjustable to desired angular positions relative to the vehicle chassi or frame and the lower steering column section 2, respectively.

What I claim is:

1. A steering gear for wheel-driven vehicles, especially for automobiles, comprising a steering column divided into two sections, namely at least one lower steering column section connected to wheel steering means such as a steering worm, and at least one upper steering column section, to which the steering wheel of the vehicle is attached, the two steering column sections being interconnected by means of a torque transmitting system of gears which permit mutual axial relative movement of the sections, characterized in that the two steering column sections are off-set in relation to each other and, have their ends journalled in a housing and support therein each a column bevel gear wheel, said two gear wheels being drivingly interconnected by an intermediate member provided with a bevel gear wheel at both ends in engagement with said column bevel gear wheels on said sections and rotatably mounted in bearings in said housing, said housing being partitioned at its middle into two halves which are rotatably adjustable relative one another to different positions to enable the column sections to form different angles with each other, and said housing being adjustably positioned along a circular arc guide having its centre at the lower end portion of said lower steering column section, means being provided for locking said housing and said halves of the housing in the desired position along said path and relative one another respectively, to obtain the desired position of said upper and lower column sections relative one another.

2. A steering gear according to claim 1, characterized in that each column passes through a bearing in the wall of the respective half of the housing and has its end journalled in a bearing provided in a lid or cover detachably mounted in an opening in the wall of the housing so that when the respective column section presses on the lid or cover with a predetermined axial force, the cover will leave its seat and permit axial displacement of the column section relative to the housing, said opening having a greater diameter than the diameter of the bevel gear on the column section to permit the bevel gear wheel to pass out through said opening.

3. A steering gear according to claim 2, characterized in that the two housing halves are provided each with a circular flange at the inner end of the respective half of the housing, said flanges being in contact with each other and having axial bores for receiving a locking pin to lock the halves in the desired angular position relative one another.

4. A steering gear according to claim 3, characterized in that the two circular flanges of the housing are guided in an upper and a lower rail with U-section and forming a circular arc path guide for the housing, and that means are provided for locking the housing in different positions along said path.

* * * * *